United States Patent
Han et al.

(10) Patent No.: US 7,079,342 B1
(45) Date of Patent: Jul. 18, 2006

(54) METHOD AND APPARATUS FOR ASYMMETRY CORRECTION IN MAGNETIC RECORDING CHANNELS

(75) Inventors: Ke Han, Fremont, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 10/974,604

(22) Filed: Oct. 27, 2004

Related U.S. Application Data

(60) Provisional application No. 60/591,526, filed on Jul. 26, 2004.

(51) Int. Cl.
*G11B 5/09* (2006.01)
(52) U.S. Cl. ........................................ 360/46
(58) Field of Classification Search ............ None
See application file for complete search history.

(56) References Cited

U.S. PATENT DOCUMENTS

| | | | |
|---|---|---|---|
| 5,744,993 A | 4/1998 | Sonntag | |
| 6,043,943 A | 3/2000 | Rezzi et al. | |
| 6,147,828 A | 11/2000 | Bloodworth et al. | |
| 6,400,518 B1 | 6/2002 | Bhaumik et al. | |
| 6,529,340 B1 | 3/2003 | Gowda et al. | |
| 2002/0154430 A1* | 10/2002 | Rae et al. | 360/25 |
| 2005/0114134 A1* | 5/2005 | Deng et al. | 704/255 |
| 2005/0219729 A1* | 10/2005 | Franck | 360/46 |

* cited by examiner

*Primary Examiner*—Wayne Young
*Assistant Examiner*—Glenda P. Rodriguez

(57) ABSTRACT

Asymmetry correction for an MR read head in a magnetic recording channel employs an exponential function to correct MR read head asymmetry. The asymmetry correction function has the form $f_{ASC}(y)=y-q(e^{ay}+e^{-ay}-2)$, wherein a is a parameter that can be adjusted for optimal channel performance, and q is an asymmetry correction coefficient.

11 Claims, 5 Drawing Sheets

METHOD AND APPARATUS FOR ASYMMETRY CORRECTION IN MAGNETIC RECORDING CHANNELS

This application claims the benefit of U.S. Provisional Application No. 60/591,526, filed Jul. 26, 2004.

BACKGROUND OF THE INVENTION

1. Field of the Invention

The present invention relates to a magnetic recording system, and more specifically, to asymmetry correction for a magnetic recording read channel with magneto-resistive (MR) read heads.

2. Description of the Related Art

It is known to use MR read heads to read signals in magnetic media. The MR head reads the stored signals by converting a magnetic field into resistance. Because of nonlinear effects, the MR read head introduces asymmetry into magnetic recording channels.

FIG. 1 is a block diagram of a conventional magnetic recording channel 100 with an MR head, and resulting asymmetry. Only parts relevant to asymmetry correction are shown. In FIG. 1, an H(jω) block 101 represents the head/media response. A block 102 for $x+px^2$ models the MR head asymmetry. The output of the block 102 passes through an equalizer 120 including a filter, such as a CTF (continuous-time filter) 103; in one embodiment, through an ADC (analog-to-digital converter) or sampler 104; and an output adjustment block, such as a FIR (finite impulse response) block 105.

MR read head asymmetry degrades performance. Since the MR read head asymmetry, modeled in general by a function $x+px^2$, is nonlinear, it needs to be corrected nonlinearly. An accepted practice is to use another nonlinear function to counteract the MR read head asymmetry at a position as close to the origin of the asymmetry as possible.

One conventional way of providing the additional nonlinear function is to introduce a second-order nonlinear function $-qy^2$ to offset the asymmetry of the MR read head. The scheme for this MR read head asymmetry correction approach is shown in the magnetic recording channel 100' depicted in FIG. 2, in which the second-order correction is provided in block 110, which also shows an equalizer 120' through which the output of that block passes. However, a second-order function is not easy to implement in analog circuitry.

Therefore, it would be advantageous to provide an easier-to-implement method and apparatus for MR read head asymmetry correction.

SUMMARY OF THE INVENTION

In view of the foregoing, it is an object of the present invention to provide a method and apparatus for asymmetry correction for an MR read head which employs an exponential function to correct the MR read head asymmetry. Specifically, the asymmetry correction function is: $f_{ASC}(y) = y - q(e^{ay} + e^{-ay} - 2)$, wherein a is a parameter that can be adjusted for optimal channel performance, and q is the asymmetry correction coefficient.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1:
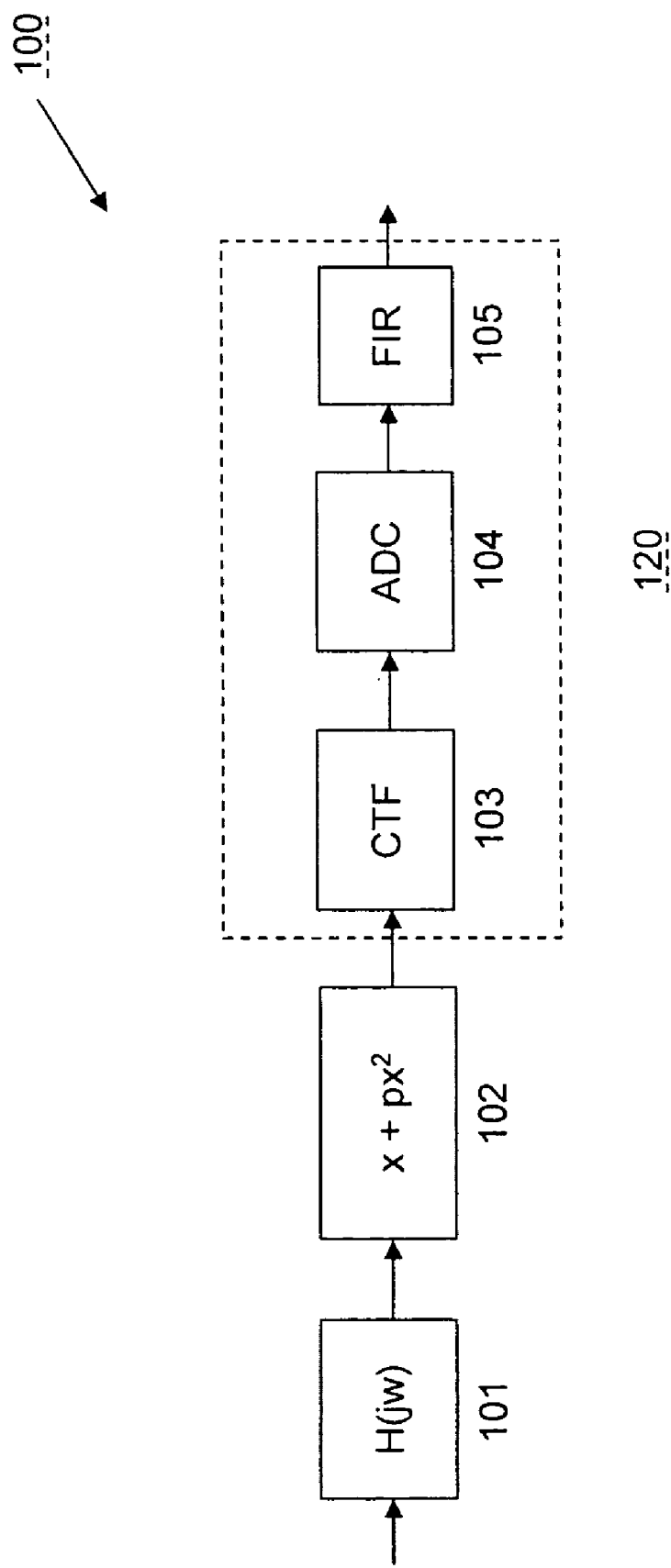
FIG. 1 is a block diagram of a conventional magnetic recording channel with MR asymmetry.
Figure 2:
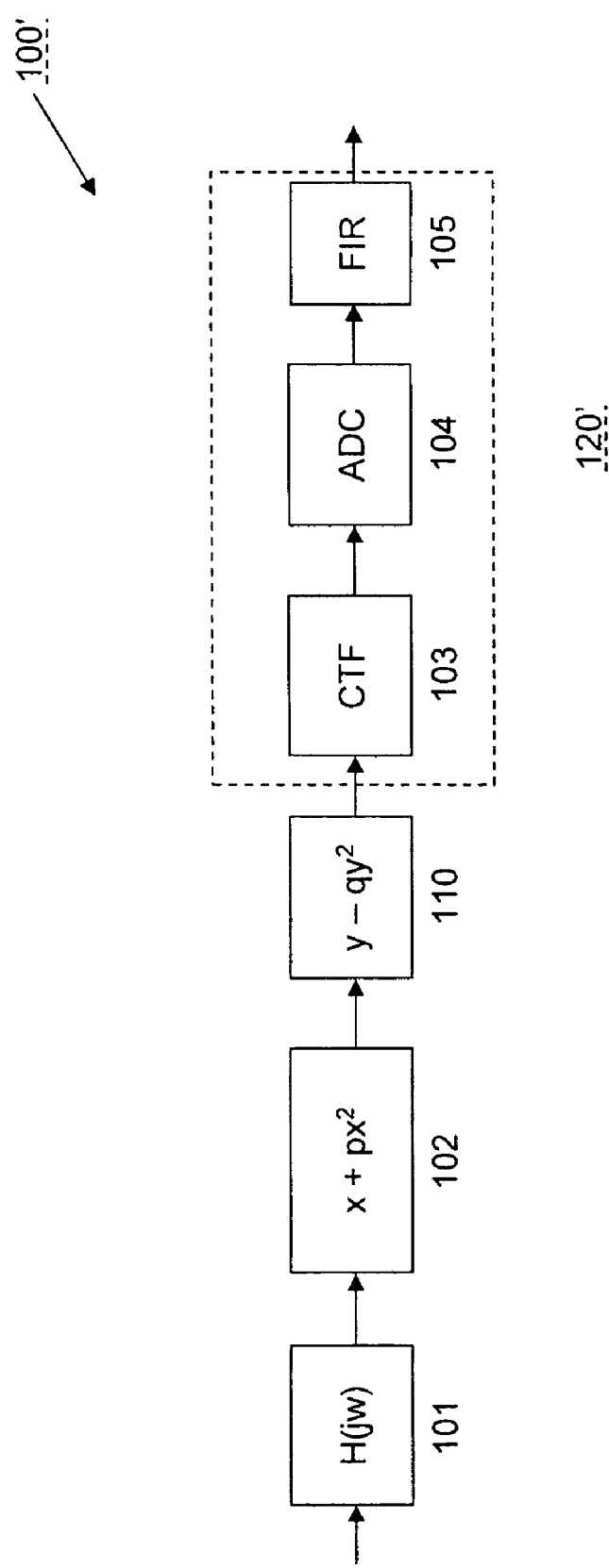
FIG. 2 shows the channel of FIG. 1 with a conventional MR read head asymmetry correction approach.
Figure 3:
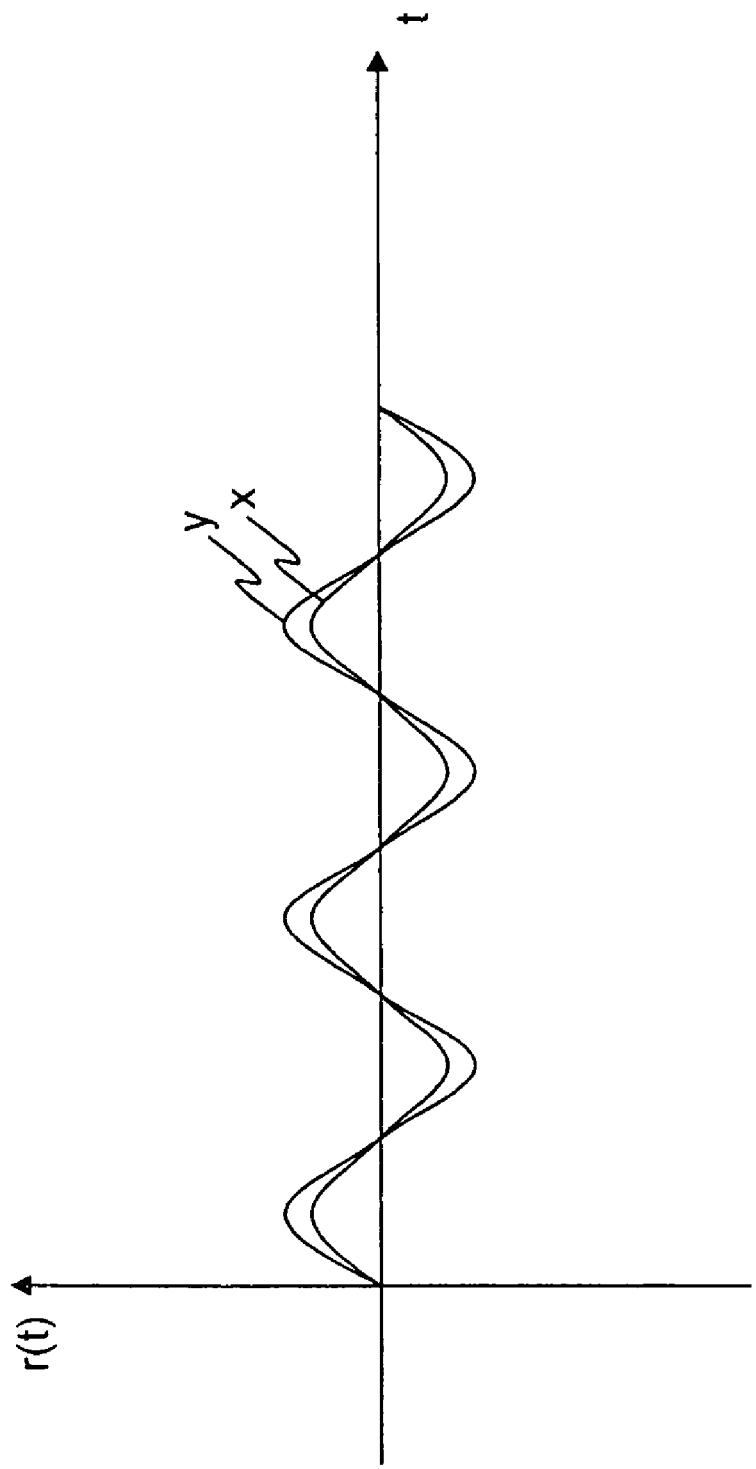
FIG. 3 shows the waveforms of the input and output of an MR read head.

In the second order polynomial $x+px^2$ modeling the read head asymmetry, the second order term $px^2$ increases the positive amplitude of the output of the MR read head, and reduces the negative amplitude of the output. As shown in FIG. 3, when an asymmetry block $y=x+px^2$ receives a sinusoidal waveform X, it outputs a waveform Y with the positive amplitude enhanced, and the negative amplitude reduced.

The purpose of asymmetry correction is to remove the effect of the second order variant $px^2$, so that the amplitude of the output of the MR read head will be substantially linear with that of its input, both on the negative side and on the positive side.

Figure 4:
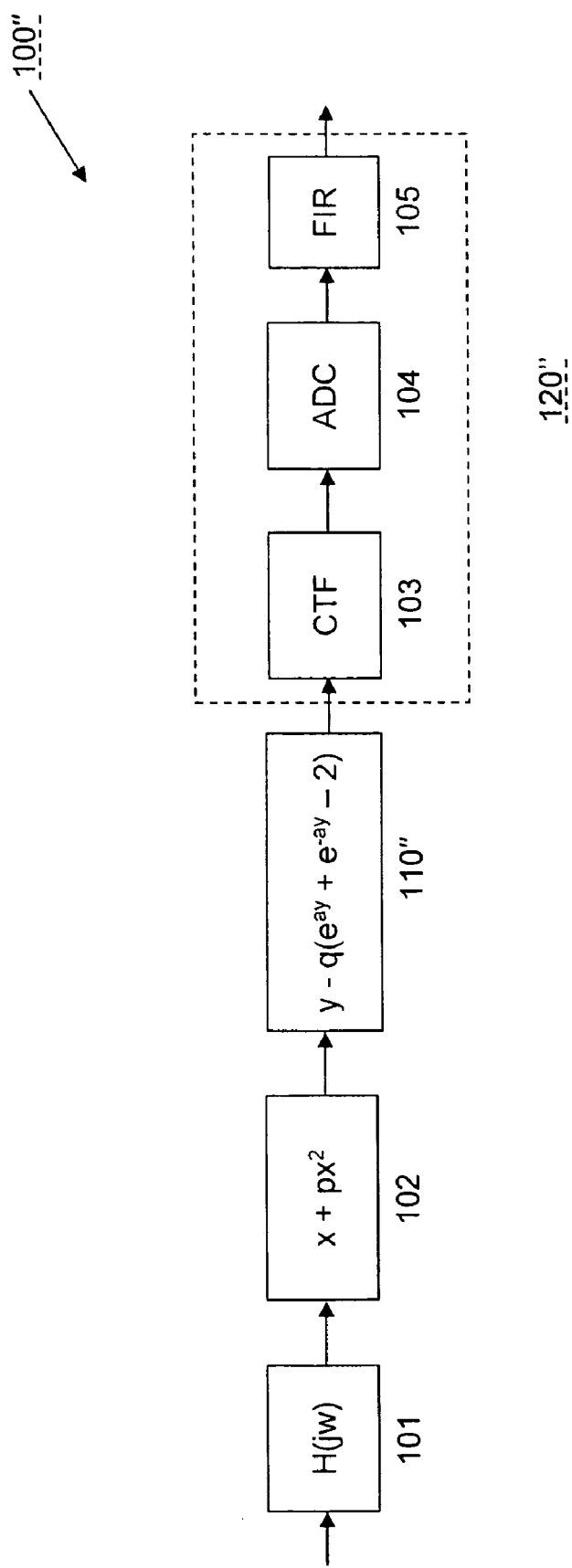
FIG. 4 shows a scheme for MR read head asymmetry correction according to one embodiment of the present invention.

In contrast to the conventional approaches, the present invention uses an exponential function for asymmetry correction. FIG. 4 is a block diagram of a MR read channel 100" employing MR read head asymmetry correction according to the invention.

The asymmetry correction function of this scheme is: $f_{ASC}(y) = y - q(e^{ay} + e^{-ay} - 2)$.

One advantage of the invention is that an exponential function is easier to implement in analog circuitry than a square function would be.

Figure 5:
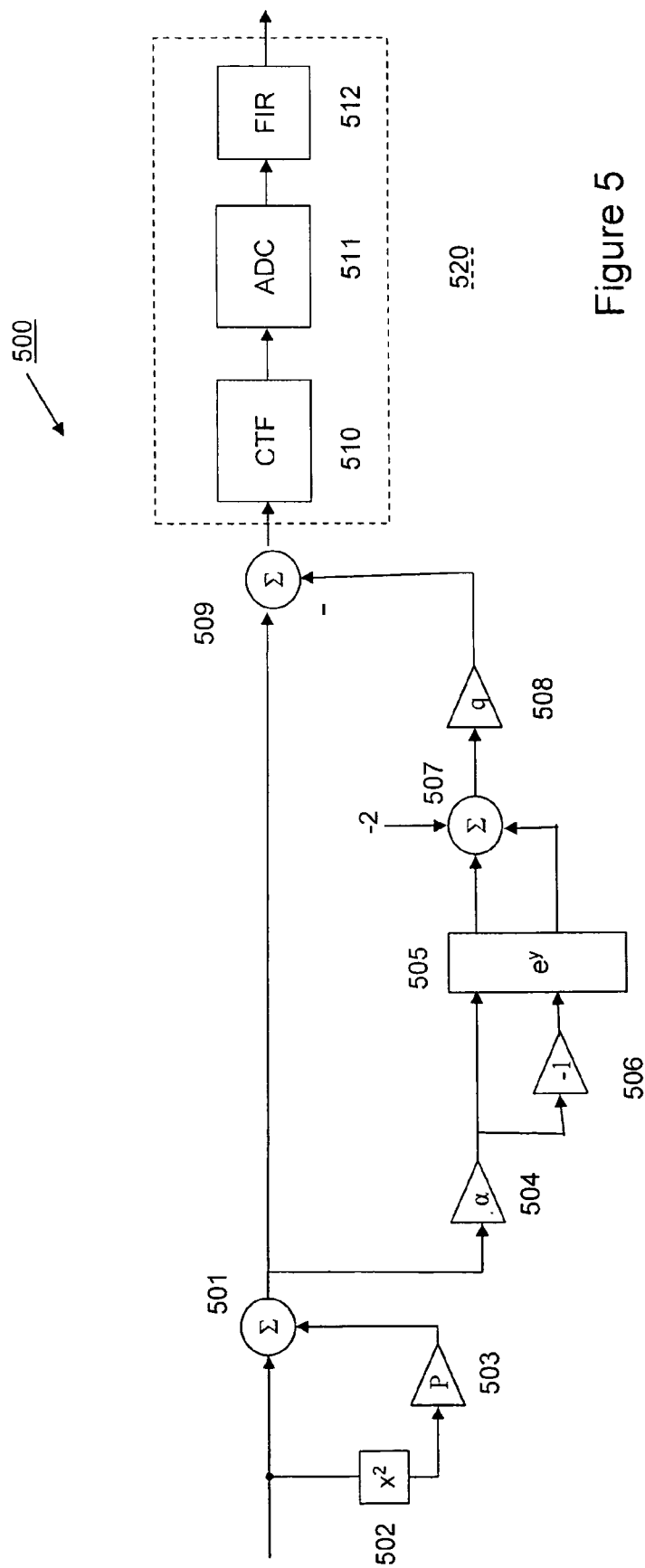
FIG. 5 is a block diagram of the read channel according to one embodiment of the present invention.

FIG. 5 shows a block diagram of a read channel 500 according to one embodiment of the present invention. In FIG. 5, the head/media response at an input to read channel 500 is depicted by an adder 501, a squaring block 502, and a scaling block 503 which scales the output of block 502 by a factor P before providing it to adder 501. The result input to read channel 500 is scaled by a factor a at a block 504 and sent to an exponential function block 505. The output of the block 504 is also inverted at block 506 and sent to an exponential function block 505. An adder 507 adds the signals from the exponential function block 505, and a constant −2. The output of the adder 507 is scaled by a factor q in block 508, and then subtracted from the output of the adder 501 at the subtractor 509. The output of the subtractor 509 goes through an equalizer 520 including, in one embodiment, a filter such as a CTF 510; an ADC block 511; and an adjustment block such as FIR block 512. Other types of filters or impulse response blocks could be used.

It should be understood that the scheme for the MR head asymmetry correction shown in FIG. 5 could be implemented by other circuitry. The configuration of FIG. 5, including the configuration of equalizer 520 is merely exemplary.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. An apparatus for correcting asymmetry in a magnetic recording read channel which comprises a magneto-resistive (MR) read head, the apparatus comprising a nonlinear adjustment block for applying an exponential function including one or more terms of the form exp(y) as a nonlinear adjustment to an output of the MR read head to introduce an adjustable exponential non-linearity thereof into the read channel to offset asymmetry of the MR read head, wherein the exponential function is based on $f_{ASC}(y)=y-q(e^{ay}+e^{-ay}-2)$, and wherein a is a parameter that can be adjusted for optimal channel performance, and q is an asymmetry correction coefficient.

2. A magnetic recording read channel comprising:
   a magnetoresistive (MR) read head, apparatus according to claim 1; and
   an equalizer for adjusting responses of the read channel.

3. The read channel of claim 2, wherein the equalizer comprises:
   a filter for filtering the nonlinear adjustment; and
   a response block for adjusting responses of the channel in accordance with an output of the filter.

4. The read channel of claim 3, wherein the filter is a continuous time filter and the response block is a finite impulse response block, the channel further comprising an analog to digital converter, between the continuous time filter and the finite impulse response block, for sampling an output of the continuous time filter.

5. An apparatus for correcting asymmetry in a magnetic recording read channel which comprises means for receiving magnetic recording signals, the apparatus comprising means for applying an exponential function including one or more terms of the form exp(y) as a nonlinear adjustment to an output of the means for receiving to introduce an adjustable exponential non-linearity thereof into the read channel to offset asymmetry of the means for receiving, wherein the exponential function is based on $f_{ASC}(y)=y-q(e^{ay}+e^{-ay}-2)$, and wherein a is a parameter that can be adjusted for optimal channel performance, and q is an asymmetry correction coefficient.

6. A magnetic recording read channel comprising:
   means for receiving magnetic recording signals and providing an output, apparatus according to claim 5; and
   means for adjusting responses of the channel.

7. The read channel of claim 6, wherein the means for adjusting comprises:
   means for filtering the nonlinear adjustment; and
   means for adjusting responses of the channel in accordance with the means for filtering.

8. The read channel of claim 7, wherein the means for filtering comprises a continuous time filter and the means for adjusting comprises a finite impulse response block, the channel further comprising an analog to digital converter, between the continuous time filter and the finite impulse response block, for sampling an output of the continuous time filter.

9. A method for correcting asymmetry in a magnetic recording read channel which comprises a magneto-resistive (MR) read head, the method comprising applying an exponential function including one or more terms of the form exp(y) as a nonlinear adjustment to an output of the MR read head to introduce an adjustable exponential non-linearity thereof into the read channel to offset asymmetry of the MR read head, wherein the exponential function is based on $f_{ASC}(y)=y-q(e^{ay}+e^{-ay}-2)$, wherein a is a parameter that can be adjusted for optimal channel performance, and q is an asymmetry correction coefficient.

10. The method of claim 9, further comprising:
    filtering an output of the nonlinear adjustment; and
    adjusting responses of the channel in a finite impulse response block.

11. The method of claim 10, wherein the filtering comprises continuous time filtering, and the adjusting comprises adjusting in a finite impulse response block, the method further comprising analog-to-digital sampling of an output of a result of the filtering.

* * * * *